BALANCE CONTROL SYSTEM FOR STEREO AMPLIFIER
Filed Oct. 26, 1959
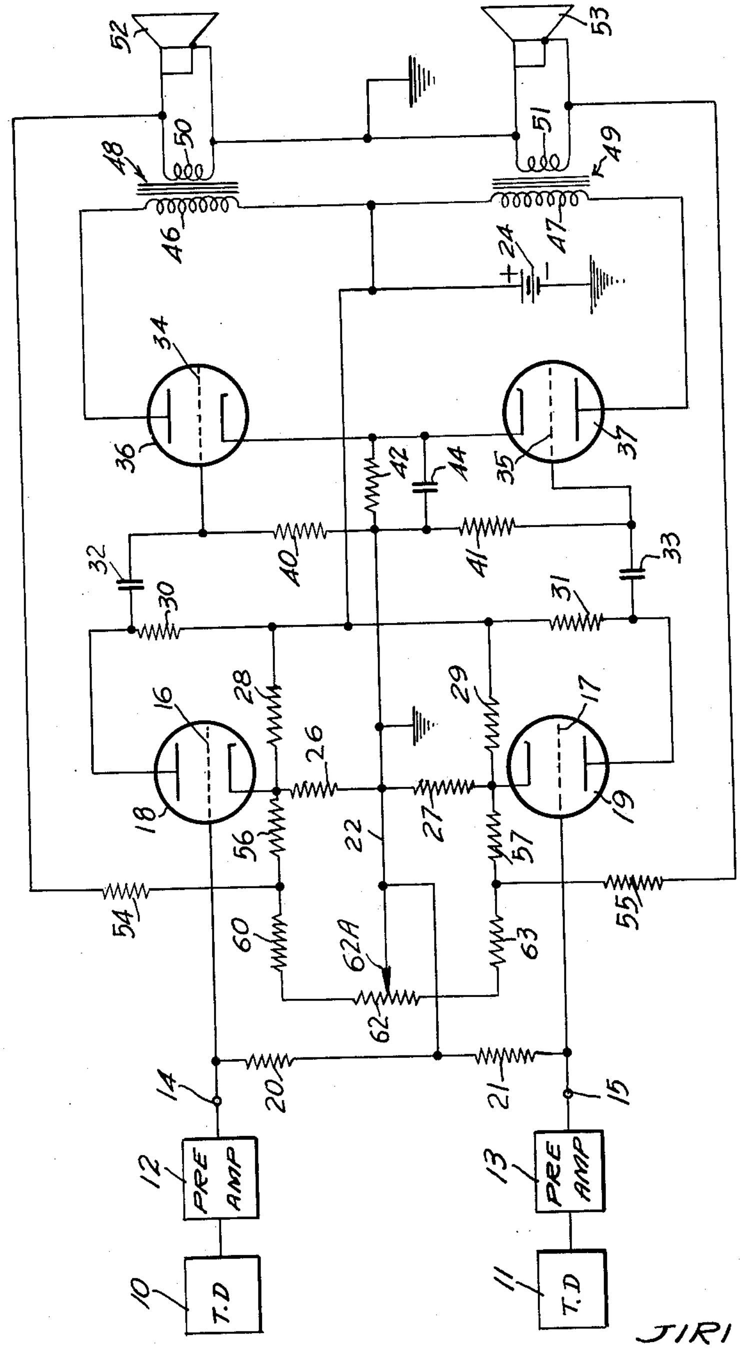
INVENTOR.
JIRI M. NESSEL
BY Lyon & Lyon
ATTORNEYS United States Patent Office 3,039,062

Patented June 12, 1962

3,039,062

BALANCE CONTROL SYSTEM FOR STEREO AMPLIFIER

Jiri M. Nessel, Los Angeles, Calif., assignor to Capitol Records, Inc., Los Angeles, Calif., a corporation of California Filed Oct. 26, 1959, Ser. No. 848,748
3 Claims. (Cl. 330—84)

The present invention relates to an improved stereo amplifier system and particularly one in which a balance between two channels is obtained by varying the degree of negative feedback to the two channels.

A conventional stereo system involves a pair of amplifying networks for amplifying the signal derived from so-called left and right channels. There has been recognized the need to balance the output from the channel amplifiers to give best results under various listening conditions. Usually for this purpose a separate volume control for each channel is used. In such stereo amplifiers a separate balance control knob actuates a ganged volume control which serves to decrease the signal in one channel while increasing the signal in the other channel. One of the main disadvantages of this method of balancing the two channels is that the ganged volume control in its adjustment serves also to attenuate a part of the available gain in the stereo amplifier; and to compensate for this loss or attenuation, additional amplification is necessary. The result is that components required for this purpose increase the cost of the amplifier.

In accordance with the present invention the disadvantages inherent in use of a volume control potentiometer for balancing purposes is obviated, this being achieved by the use of a single variable resistance in a negative feedback loop supplying negative feedback to the two channels. The movable arm or tap of the resistance is connected to the B-plus or ground terminal of the amplifier and its two ends are connected into the negative feedback loops of the left and right channels so that the gain in one or the other channel in the amplifier is increased when the balance control is turned one way or the other, and no additional amplification in the amplifier is necessary for proper operation of the balance control.

It is therefore an object of the present invention to provide an improved balance control system for a stereo amplifier featured by the fact that the degree of negative feedback is adjusted for this purpose.

Another object of the present invention is to provide an improved balancing system for a stereo amplifier which obviates the disadvantages inherent in prior art amplifiers using volume controls for balancing purposes.

Another object of the present invention is to provide a balancing system for a stereo amplifier characterized by its simplicity and low cost.

The features of the present invention which are believed to be novel are set forth with particularity in the appended claims. This invention itself, both as to its organization and manner of operation, together with futher objects and advantages thereof, may be best understood by reference to the following description taken in connection with the accompanying drawings in which:

The single FIGURE of the drawings illustrates a stereo amplifier system embodying features of the present invention.

The amplifier presently described is particularly useful in the reproduction of stereo recordings from records or tapes and involves the use of two separate transducers 10 and 11 for converting mechanical movement into corresponding electrical variations or signals which are applied respectively to a so-called left channel and a so-called right channel.

The output of the transducer 10 is illustrated as being applied to preamplifier 12 which includes conventional volume control means and the output of the preamplifier 12 is applied to the left channel terminal 14. Similarly, a second transducer 11 in the right channel is illustrated as having its output applied to the preamplifier 13 having conventional volume control means therein and the output of the preamplifier 13 is applied to the right channel terminal 15. The terminal 14 is connected to the control grid 16 of tube 18; and likewise, the terminal 15 is connected to the control grid 17 of tube 19. Bias resistances 20 and 21 of equal values are serially connected between the terminals 14 and 15 and their junction point is connected to the B-minus lead 22 or to ground. It is understood that the lead 22, in the case of a conventional A.C. rectifier, may be connected directly to the metal chassis on which the various components are mounted; and in the case of an A.C.—D.C. type of rectifier circuit, the lead 22 may be at a potential different than the potential of such chassis. In either case, however, the lead 22 constitutes a so-called B-minus lead.

For purposes of simplification, the voltage source supplying the amplifier is illustrated as a battery 24 having its negative terminal grounded, the lead 22 being also illustrated as being grounded.

The cathodes of tubes 18 and 19 are returned to ground through corresponding resistances 26 and 27 having their junction point grounded so as to provide, with the previously mentioned resistances 20 and 21, proper operating bias between corresponding control grids and the cathodes of tubes 18 and 19.

It is noted in this respect that the resistances 26 and 27 form also part of individual voltage dividing circuits, the first voltage dividing circuit comprising the serially connected source 24, resistances 28 and 26 with the junction point of resistances 26 and 28 being connected to the cathode of tube 18. The other like voltage dividing circuit comprises the serially connected source 24 and resistances 29 and 27, the junction point of resistances 27 and 29 being connected to the cathode of tube 19. Using such voltage dividing circuits, the bias on the control grids of tubes 18 and 19 is increased.

The anode of tube 18 is connected to the positive terminal of source 24 through its load resistance 30. Similarly, the anode of tube 19 is connected through its load resistance 31 to the same positive terminal of source 24. The amplified voltage appearing on the anode of tube 18 is coupled through a coupling condenser 32 to the control grid 34 of tube 36. Similarly, the amplified voltage developed on the anode of tube 19 is coupled to the control grid 35 of tube 37 through coupling condenser 33. These control grids 34 and 35 are interconnected by the serially connected resistances 40 and 41 having their junction point grounded. The cathodes of tubes 36 and 37 are returned to ground through a common bias resistance 42 which is shunted by condenser 44.

The anode of tube 36 is connected to the B-plus or positive terminal of source 24 through the primary winding 46 of transformer 48; and similarly, the anode of tube 37 is connected to the positive terminal of source 24 through the primary winding 47 of transformer 49.

The secondary winding 50 of transformer 48 is connected to the sound reproducer 52; and similarly, the secondary winding 51 of transformer 49 is connected to the sound reproducer 53.

Negative feedback is provided in the system using the following described circuitry. One terminal of each of the secondary windings 50 and 51 is grounded, the other terminal of winding 50 being coupled to the cathode of tube 18 through the serially connected resistances 54 and 56; and similarly, the other terminal of winding 51 is coupled to the cathode of tube 19 through the serially connected resistances 55 and 57.

In accordance with an important feature of the present invention, the junction point of resistances 54 and 56 is connected through resistance 60 to one outside terminal of the potentiometer resistance 62, the other outside terminal of resistance 62 being connected through resistance 63 to the junction point of resistances 55 and 57; and the adjustable tap 62A of resistance 62 is grounded.

In operation of the system described above, the terminal 14 is considered to be the input terminal or jack for the left terminal and the terminal 15 is the input jack or terminal for the right terminal; and the potentiometer resistance 62 serves as a balance control potentiometer with the resistances 60 and 63 serving as balance control limiting resistances.

When a signal developed from transducer 10 is applied to the left channel terminal 14, a corresponding voltage appears across the secondary winding 50 of transformer 48 and the signal is reproduced by the speaker 52. A portion of this voltage appearing on the secondary winding 50 is applied through resistances 54 and 56 to the cathode of tube 18 and appears across the resistance 26 to establish a degree of negative feedback. The magnitude of this feedback may, for example, be minus-17 decibels.

Similarly, the signal applied from the transducer 11 to the terminal 15 is amplified successively in amplifying tubes 19 and 37 and appears in amplified form across the secondary winding 51 of transformer 49 for operating the speaker 53. A portion of such voltage applied to the speaker 53 is applied as a negative feedback voltage to the cathode of tube 19 through a path which includes the resistances 55 and 57. Thus, the negative feedback voltage is applied to the cathodes of both tubes 18 and 19. The amount of feedback applied to the individual cathodes is controlled by adjustment of the tap 62A on resistance 62.

When the grounded tap 62A is moved upwardly as illustrated in the drawing and reaches the junction point of resistances 62 and 60, the negative feedback voltage applied through resistance 54 and appearing at the cathode of tube 18 is decreased, thereby increasing the gain in the upper or left channel, which includes tube 18, by about six decibels. When the tap 62A is moved to its lowermost position corresponding generally to the junction point of resistances 62 and 63, the negative feedback voltage applied through resistance 54 and appearing at the cathode of tube 18 is increased to the originally established value of minus-17 decibels.

The left and right channels are symmetrical with respect to their components and the values of such components and thus it will be readily understood that as the grounded balance control tap 62A is moved towards resistance 63, the gain in the right channel comprising tube 19 increases and simultaneously the gain in the left channel decreases. This allows the single potentiometer control 62 to perform balance of both channels without consuming any available gain in either channel.

It will be understood that the amplifiers in the right and left channels may comprise one, two or more stages and may be built as single-ended or push-pull amplifiers. Further triodes or pentodes may be used in each channel in any stage.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a stereo system wherein it is desired to provide a balance in two channels of said system, a first signal-amplifying channel having an output terminal, a second signal-amplifying channel having an output terminal, said first channel including an amplifying tube having a cathode and a control grid, said control grid comprising an input terminal, said second channel including an amplifying tube having a cathode and a control grid, the last mentioned control grid comprising an input terminal for said second channel, a first pair of resistances which are serially connected and interconnecting the cathodes of the first and second tubes, a first negative voltage feedback circuit extending from the output terminal of the first channel to the input of said first channel comprising a second pair of serially connected resistances extending from the cathode of the first tube to the output terminal of said first channel, a third pair of serially connected resistances extending from the cathode of the second tube to the output terminal of said second channel to provide a negative feedback connection for said second channel, said second pair of resistances being connected at a first junction point, said third pair of resistances being connected at a second junction point, a potentiometer-type resistance having its outside terminals connected correspondingly to said first and said second junction points, and the movable tap on said potentiometer-type resistance being connected to the junction point of the first pair of resistances.

2. In a stereo system wherein a first signal is translated through a first channel having an input circuit which includes an input terminal, an output terminal and amplifying means therebetween, a second signal-translating channel having an input circuit which includes an input terminal, an output terminal and amplifying means therebetween, first means transferring a negative feedback voltage from the output terminal of said first channel to the input circuit of said first channel, said means comprising a first pair of resistances connected at a first junction point, second means transferring a negative feedback voltage from the output terminal of the second channel to the input circuit of said second channel, said second means comprising a second pair of resistances interconnected at a second junction point, a fifth resistance, a potentiometer-type resistance and a sixth resistance, said fifth resistance having one of its terminals connected to said first junction point and the other one of its terminals connected to an outside terminal of said potentiometer resistance, said sixth resistance having one of its terminals connected to said second junction point and the other one of its terminals connected to the other outside terminal of said potentiometer resistance, impedance means interconnecting said input circuits of said first and second channels, and means connecting the tap on said potentiometer resistance to an intermediate point on said impedance means.

3. A system as set forth in claim 2 in which the impedance means comprises a pair of resistances each having one of their terminals connected to said tap and the other one of the terminals of the last-mentioned pair of resistances being connected to corresponding input circuits in said first and second channels.

References Cited in the file of this patent

UNITED STATES PATENTS

| | | |
|---|---|---|
| 2,186,195 | Dalpayrat | Jan. 9, 1940 |
| 2,314,813 | Bond | Mar. 23, 1943 |
| 2,854,531 | Reijnders | Sept. 30, 1958 |
| 2,886,655 | Corderman | May 12, 1959 |
| 2,906,831 | Macdonald | Sept. 29, 1959 |